Figure 1:
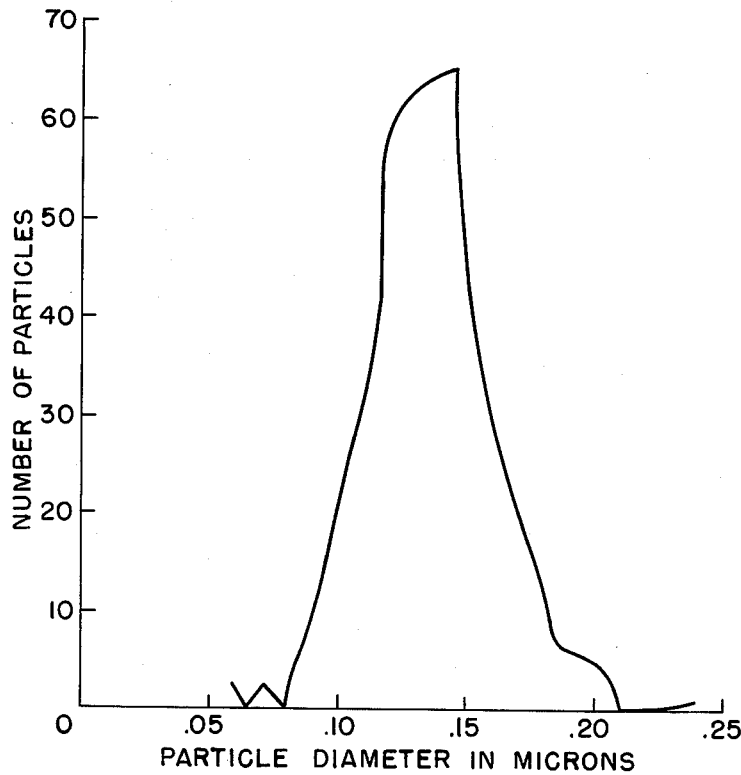

Nov. 2, 1965   S. S. PAPELL   3,215,572
LOW VISCOSITY MAGNETIC FLUID OBTAINED BY THE COLLOIDAL
SUSPENSION OF MAGNETIC PARTICLES
Filed Oct. 9, 1963

INVENTOR
SOLOMON S. PAPELL
BY
ATTORNEYS

United States Patent Office 3,215,572
Patented Nov. 2, 1965

3,215,572
LOW VISCOSITY MAGNETIC FLUID OBTAINED BY THE COLLOIDAL SUSPENSION OF MAGNETIC PARTICLES
Solomon Stephen Papell, Berea, Ohio, assignor to the United States of America as represented by the Administrator of the National Aeronautics and Space Administration
Filed Oct. 9, 1963, Ser. No. 315,096
11 Claims. (Cl. 149—2)
(Granted under Title 35, U.S. Code (1952), sec. 266)

The invention described herein may be manufactured and used by or for the Government of the United States of America for governmental purposes without the payment of any royalties thereon or therefor.

The present invention relates, generally, to a propellant fluid and, more particularly, to a low density and low viscosity magnetic propellant usable under zero-gravity conditions.

As the exploration and activity of man in space has enlarged, the questions associated with the behavior of rocket engine propellants, stored in space vehicle tanks while exposed to weightlessness (zero gravity), has become increasingly important. Since the force of gravity decreases as the rocket vehicle penetrates further into space, the liquid and vaporous phases of the rocket propellant are free to disperse throughout the tank, causing a disoriented condition. From this ensues a multitude of problems. These include, for example, effective tank venting, proper propellant pump inlet design to eliminate cavitation and surging, effective orientation control of the liquid propellant at the pump inlet to give the rocket system restart capability. The rocket propellant liquid and vapor could, of course, be separated and positioned by means of acceleration fields, such as spinning the tank or accelerating (ullage) rockets; but these methods require relatively high energy levels and complex control mechanisms, or they are otherwise undesirable, especially for large vehicles. A much more desirable solution to the problems engendered by weightlessness would be the employment of a propellant, subject to a magnetic orienting body force, to provide an artificially imposed gravity environment.

Accordingly, it is an object of the present invention to provide a propellant which may be satisfactorily oriented, and thereby utilized in a zero-gravity environment.

It is yet another object of the present invention to provide a propellant upon which an artificial gravity condition may be imposed by magnetization.

It is yet another object of this invention to provide a propellant which insures continuous flow and easy pumping, under substantially zero-gravity conditions.

It is still another object of the invention to provide a low viscosity magnetic fluid usable as a rocket propellant.

Figure 2:
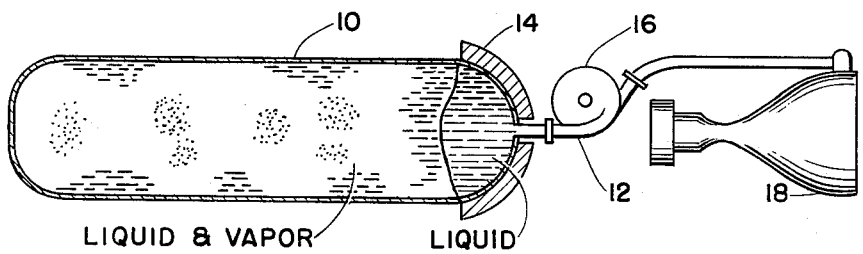

A more complete appreciation of the invention and many attendant advantages thereof will be readily appreciated as the same becomes better understood through reference to the following detailed description, considered in connection with the accompanying drawing wherein:

FIG. 1 typifies the size distribution of magnetic particles colloidally suspended in a rocket propellant; and FIG. 2 is an elevation view partly in section of an apparatus in which the novel magnetized propellant may be oriented and therefore efficiently utilized.

According to the present invention, the foregoing and other objects are obtained by the provision of a novel magnetized liquid propellant. The magnetic particles are dispersed throughout the propellant and colloidally suspended therein, by utilizing particles of submicron size, so that the surface area of each particle is extremely large in relation to its mass. Because of the small particle size and large surface area, the particles attract and hold the molecules of propellant (the dispersion medium) by surface tension and/or adsorption, thereby assuring that the magnetized particles cannot settle out of the fluid propellant. Additionally, because of the relatively small amount of magnetic material present, the propellant forms the major constituent of the colloid to provide low viscosity, easy flowability and low energy penalty due to the introduction of the noncombustible particles.

In preparing the magnetic propellant for the purposes described, various powdered magnetic materials such as nickel, cobalt, iron or various iron oxides may be used; however, the black oxide of iron, magnetite ($Fe_3O_4$), has been found most satisfactory in practice. The particle size of the magnetic particles preferably should be less than 0.25 micron in diameter to insure that a true colloid is formed and, advantageously, may include particles of less than 0.10 micron in diameter.

Although extremely fine particle sizes are obtainable by several known processes (e.g.: vacuum deposition, condensation, and chemical precipitation or combination), in practice grinding has been found to be a simple and satisfactory method for obtaining a colloidal suspension of the magnetized iron particles. Dispersion is accomplished by grinding commercially obtained powdered magnetite (a particle size of approximately 30 microns) in a ball mill in the presence of the propellant and a grinding agent, which prevents agglomeration or welding of the minute particles as grinding progresses. Generally, the grinding aide should comprise between 2–10 percent by weight of the metal particles and the grinding process continue until the colloid solution is composed of 0.5–10 percent by weight of suspended magnetic particles. These proportions insure that a proper particle size is obtained without agglomeration and, additionally, that the formed colloid is sufficiently magnetic for orientation by a magnetic field, and yet does not have too grave an energy-penalty-loss due to the added weight of magnetic particles in the combustible propellant. Ideally, by the above process the formed magnetic colloidal propellant comprises 0.5 percent magnitite (by weight), with the remainder of the propellant solution formed in large part by the combustible propellant with only a small percentage present (less than 1 percent by weight) of grinding aide.

The following examples describe in greater detail the production of the novel magnetic propellant in accordance with the invention. The colloids were both formed in the same apparatus employing the following general procedure: a powdered metal slurry comprising the propellant, a surplus of powdered $Fe_3O_4$, and grinding agent was milled by placing the slurry in a stainless steel ball mill of one quart size, having three equally spaced internal ribs mounted on its circumference, ¼ inch in cross section and running the length of the jar. The mill was loaded with 3000 grams of stainless steel balls ½ inch in diameter and rotated at 48 r.p.m. for several days as set out below, after which, the formed colloid solution was decanted off and additional propellant and grinding agent added and milling continued. Additional charges of propellant and grinding agent were added as more colloid was decanted off, until the powdered magnetic iron remaining in slurry form in the mill was diminished to the point where grinding was no longer efficient.

*Example 1*

In this example a magnetic colloidal solution of heptane, oleic acid and powdered magnetite was formed.

The mill was initially charged with 300 milliliters of normal heptane, 30 grams of oleic acid and 200 grams of magnetite. After 19 days of milling, the slurry was allowed to settle and 200 milliliters of colloid solution were decanted off. An additional charge of approximately 200 milliliters of propellant and grinding agent, in the same proportion as above (10 milliliters of heptane to 1 gram of oleic acid) was added, and grinding proceeded for 6 days at which time another 200 milliliters of colloid were decanted off and the process of adding additional heptane and oleic acid and then grinding was repeated.

The decanted colloid was found to have a dark brownish color and, as illustrated in FIG. 1, a particle size distribution of between approximately 0.06 to 0.24 micron with the majority of the particles between 0.10–0.20 micron in size and a mean particle size of approximately 0.135 micron. This small particle size yields a true colloidal suspension when the amount of powdered magnetite is limited to a maximum of approximately 10 percent by weight of the solution. The colloidal solution then has a density only slightly above that of heptane (0.684 gm./ml.) and essentially the same viscosity to thereby provide low energy flow losses (e.g., pumping).

*Example 2*

In this example a colloidal solution of $JP_4$ (a common rocket and turbojet fuel), oleic acid and powdered magnetite was formed.

Initially the ball mill was charged with 300 milliliters of $JP_4$, 30 grams of oleic acid and 200 grams of magnetite; and the process of grinding and decanting off the formed colloidal solution, as generally described, proceeded as before.

After an initial grinding period of 15 days, the slurry was allowed to settle and 180 milliliters of colloidal solution was decanted off. Approximately 180 milliliters of $JP_4$ and oleic acid (10 milliliters of $JP_4$ to 1 gram of oleic acid) were added and grinding continued for 6 days. The magnetic propellant was again decanted off and the process repeated. Again the colloid was found to be a dark brown color with a density and viscosity closely approaching that of the particle carrier, $JP_4$.

Each of these colloidal solutions (Examples 1 and 2) exhibited strong magnetic properties and was easily oriented by the imposition of a magnetic field. Further, samples of the heptane and $JP_4$ magnetic propellants were found, upon dilution, to exhibit strong magnetic properties with as low as 0.5 percent powdered magnetite. Thus, a satisfactory magnetic propellant was obtained having a low energy penalty and a minimum amount of oleic acid present, i.e., approximately 0.24 percent oleic acid based on the weight of heptane or $JP_4$ in the diluted solution. The oleic acid constituent may be further minimized by utilizing a minimum of 2 percent oleic acid as the grinding aide in the slurry charged in the ball mill. This substantially increases the required grinding time (approximately twice as long), but a true colloidal solution is still obtainable with a particle size distribution similar to that illustrated in FIG. 1.

It should be apparent that higher percentages of oleic acid may also be utilized to decrease grinding time, percentages as high as 10 percent having been successfully utilized in practice. Additionally, other grinding agents such as stearic acid and cetyl alcohol may be utilized in the production of a magnetic propellant and other long chain hydrocarbons having similarly high surface tensions; such as: benzene, ethane, hydrazine, and gasoline may be utilized as the particle carrier and major constituent of the magnetic propellant.

In FIG. 2 is illustrated one apparatus which may advantageously utilize the novel magnetic propellant. The propellant is stored in a tank 10 having a discharge line 12 adjacent to which a magnet, such as a permanent magnet 14 and pump 16 is disposed. Under zero-gravity conditions, the magnet orients and attracts the colloidally suspended magnetized particles towards the discharge line 12. The hydrocarbon fuel molecules (e.g., heptane molecules) which are held to these particles by high surface tension and/or adsorption move with the magnetized particles and displace any propellant vapor in this area; the pump 16 is actuated and the magnetized propellant moves through discharge line 12 and is ignited in nozzle 18.

Obviously many modifications and variations of the present invention are possible in light of the above teachings. It is, therefore, to be understood that within the scope of the appended claims, the invention may be practiced other than as specifically described.

What is claimed is:

1. A fluid rocket propellant for use in a zero-gravity environment comprising a colloidal solution of a fuel and magnetizable particles of a size less than 0.25 micron in diameter whereby said propellant may be oriented and attracted by the imposition of a magnetic field.

2. A magnetizable fluid for use as a rocket propellant, said fluid including finely divided iron particles of a size less than 0.25 micron and with an average particle size between 0.10 and 0.20 micron colloidally suspended in a liquid propellant, said iron particles comprising between 0.5–10 percent by weight of the liquid propellant.

3. The magnetizable fluid set forth in claim 2 wherein the liquid propellant is a long chain hydrocarbon fuel.

4. A propellant fluid for use in a rocket engine comprising a long chain hydrocarbon fuel and magnetizable particles colloidally suspended in said fuel, said magnetizable particles being less than 0.25 micron in diameter and comprising 0.5–10 percent by weight of the fuel.

5. A magnetizable fluid for use as a rocket propellant, said fluid consisting of finely divided submicron magnetite particles having a particle size distribution between 0.06 and 0.24 micron and a mean particle size of approximately 0.135 micron, said particles being colloidally suspended in a solution of a long chain hydrocarbon propellant and oleic acid, said magnetite particles comprising between 0.5–10 percent based on the weight of the solution, said oleic acid comprising between 0.1–10 percent based on the weight of the propellant.

6. The magnetizable fluid set out in claim 5 wherein the range of size of the magnetite particles falls within 0.050 micron and 0.24 micron.

7. The magnetizable fluid set out in claim 6 wherein the propellant is normal heptane.

8. A magnetizable fluid for use as a rocket propellant comprising finely divided magnetizable particles of a size less than 0.25 micron colloidally suspended in a liquid propellant, said magnetizable particles comprising less than 10 percent by weight based on the weight of the liquid propellant.

9. The magnetizable fluid set forth in claim 8 wherein the liquid propellant is a long chain hydrocarbon.

10. The magnetizable fluid set forth in claim 9 wherein the liquid propellant is heptane.

11. In a fluid for use as a rocket propellant, the improvement comprising a plurality of particles of magnetc material of a size less than 0.25 micron disposed in colloidal suspension in said fluid whereby said fluid may be oriented and attracted by means of a magnetic field.

References Cited by the Examiner
UNITED STATES PATENTS

| | | | |
|---|---|---|---|
| 2,809,661 | 10/57 | Gillespie | 137—565 |
| 2,890,108 | 6/59 | Toulmin | 149—87 X |
| 2,986,456 | 5/61 | Toulmin | 149—87 |
| 3,019,145 | 1/62 | Whitby | 142—87 |
| 3,119,412 | 1/64 | Kraft | 137—565 |
| 3,122,429 | 2/64 | Toulmin | 149—87 X |

OTHER REFERENCES

"Webster's New International Dictionary," second edition, unabridged (1939), page 2371.

CARL D. QUARFORTH, *Primary Examiner.*

BENJAMIN R. PADGETT, *Examiner.*